United States Patent [19]
French et al.

[11] 4,154,591
[45] May 15, 1979

[54] FABRICATION OF OPTICAL FIBERS WITH IMPROVED CROSS SECTIONAL CIRCULARITY

[75] Inventors: William G. French, Plainfield; G. William Tasker, Summit, both of N.J.

[73] Assignee: Bell Telephone Laboratories, Incorporated, Murray Hill, N.J.

[21] Appl. No.: 857,933

[22] Filed: Dec. 6, 1977

Related U.S. Application Data

[63] Continuation of Ser. No. 669,164, Mar. 22, 1976, abandoned.

[51] Int. Cl.² ............................................. C03B 37/00
[52] U.S. Cl. ..................................... 65/2; 65/3 A; 65/13; 65/81; 65/110; 65/DIG. 7
[58] Field of Search .................. 65/2, 3 A, 13, 18, 64, 65/81, 109, 110, 161, DIG. 7; 350/96.33

[56] References Cited
U.S. PATENT DOCUMENTS

| | | | |
|---|---|---|---|
| 3,737,293 | 6/1973 | Maurer | 65/3 A |
| 3,907,536 | 9/1975 | Achener | 65/3 A X |
| 3,950,073 | 4/1976 | Horiguchi et al. | 350/96.33 |
| 3,961,926 | 6/1976 | Asam | 65/3 A |

FOREIGN PATENT DOCUMENTS

| | | | |
|---|---|---|---|
| 2524335 | 11/1975 | Fed. Rep. of Germany. | |
| 51-20915 | 2/1976 | Japan | 65/3 A |
| 51-20917 | 2/1976 | Japan | 65/13 |
| 51-20918 | 2/1976 | Japan | 65/13 |

*Primary Examiner*—Robert L. Lindsay, Jr.
*Attorney, Agent, or Firm*—Peter V. D. Wilde

[57] ABSTRACT

Optical fibers are produced with improved cross sectional circularity. In the course of the fabrication process, the tubular preform from which the fibers are drawn, is collapsed under positive internal pressure. This removes most cross sectional noncircularities that may have developed during fabrication of the preform, and also ensures the collapse of the preform to a structure with circular cross section.

10 Claims, 4 Drawing Figures

FABRICATION OF OPTICAL FIBERS WITH IMPROVED CROSS SECTIONAL CIRCULARITY

This application is a continuation of application Ser. No. 669,164, filed Mar. 22, 1976 now abandoned.

BACKGROUND OF THE INVENTION

1. Field of the Invention

This invention is a method of producing optical fibers with improved cross sectional circularity.

2. Description of the Prior Art

The significance of the role to be played by optical fibers in information transmission systems is no longer in dispute. The emphasis of research and development programs in this field has shifted from that of proving practicality to one of improving transmission efficiency. An active area, which has been particularly fruitful in yielding such improvements, involves the reduction of losses in optical fibers so that they may be used for long distance transmission. The lower the optical losses in such fibers the less frequent the need for multiple optical repeaters and, consequently, the cheaper the cost of the total system.

Two fabrication processes are found to yield particularly pure fibers of loss as low as 2 db/km. One process is commonly referred to as the soot deposition technique. The other is known as the modified chemical vapor deposition technique. In the soot deposition process, discussed in U.S. Pat. Nos. 3,826,560 and 3,823,195, glass particulate matter is formed in a hydrolysis burner and deposited on a starting member such as a glass rod. Additional layers of glass of possibly varying composition, the last suitable for a cladding, are deposited on the rod and the structure is then consolidated into a transparent glass by heating in an inert environment. Subsequent to this consolidation, the starting member may be removed, thereby forming a hollow cylindrical glass structure which may be drawn into a fiber.

In the modified chemical vapor deposition process, discussed in a commonly-assigned application Ser. No. 444,705, glass precursor vapors are directed through the center of a hollow glass cylinder which is heated to sufficiently high temperatures so as to initiate a homogenous reaction within the glass cylinder. In the course of this reaction, glass particulate matter is formed, deposited on the glass cylinder, and subsequently fused onto the cylinder and into a glass by the passage of the source of heat, which periodically traverses the cylinder. The starting glass cylinder may be composed of a material appropriate for use as a cladding in the fiber.

In both of these techniques, a hollow glass cylinder may be formed. Ordinarily the cylinder has at least two compositional regions. The interior region will ultimately form the core of the optical fiber through which the optical radiation will pass. The exterior region forms the cladding for the optical fiber. The remaining critical step involves pulling this relatively large diameter (5 to 25 mm) cylindrical "preform" into a relatively small diameter (5 to 100 microns) fiber. Prior to pulling the preform into a fiber, the preform is usually collapsed to a smaller diameter, or preferably into a solid cylindrical mass.

During both preform fabrication and preform collapse, noncircularities are introduced into the otherwise circular preform cross section. If these asymmetries are not removed before pulling the preform into a fiber, they will be reflected in the cross section of the resultant fiber yielding a noncircular optical waveguide cross section. Such asymmetrical fibers are difficult to splice to other optical fibers with different cross-sectional properties, and may yield a fiber with degraded pulse dispersion properties.

The asymmetry which develops during collapse is pronounced in multi-layered preforms. Such preforms have layers of material of decreasing index of refraction as the cross section is traversed radially from the core to the cladding. These gradations yield improved transmission characteristics. However, if the interior core layers are significantly less viscous than the outer cladding layers, then the interior layers will loss much of their structural integrity during the heating to which the preform is exposed for purposes of collapse. These interior layers will then provide little support for the more viscous outer layers. This only exacerbates the tendency toward noncircular collapse.

In simple two-layered preforms, the tendency toward noncircular collapse may be especially severe. Such preforms are used to yield a fiber with high numerical aperture and, hence, a larger acceptance or entry angle for introducing radiation into the fiber. In such fibers, the core must have a significantly larger index of refraction than the cladding. Silica, highly doped with germania, provides such a core but, in addition, has much lower viscosity than the silica cladding. Significant noncircularities develop in the course of fabricating such a preform. Similar difficulties appear when other compositions are used. The severity of the noncircularities depends on the diameter of the preform, the materials utilized, and the fabrication parameters chosen.

One method to effect more symmetrical and circular cross sections involves collapsing the preform while passing a gas stream through the center of the preform — a dynamic process. The effectiveness of this technique was found to be limited. In addition it appears that the large flow of gas through the center of the tubular preform at collapsing temperatures results in dopant loss from the core material, thereby degrading the transmission characteristics of the resultant fiber.

SUMMARY OF THE INVENTION

This invention is an improved technique for producing optical fibers with circular cross sections. In the practice of this invention, a hollow cylindrical preform is collapsed while under slight positive pressure. This may be accomplished by at least partially sealing the preform at one end and statically pressurizing it through the other end. Applicants have found that under appropriate conditions of positive pressure, the preform collapses upon heating into a circular structure, rather than expanding. The technique not only prevents the introduction of additional noncircularities but, in addition, removes noncircularities that may have been present prior to the collapse.

DETAILED DESCRIPTION

Figure 1:
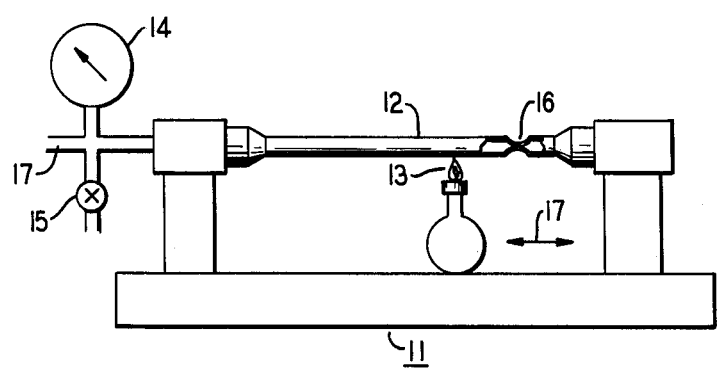
FIG. 1 is a schematic representation of an apparatus by means of which the instant invention may be practiced.

FIG. 1 is a schematic representation of an otherwise standard glass lathe modified so as to be applicable to the practice of this invention. In FIG. 1, 11 is the standard supporting structure associated with glass lathes; 12 is a hollow glass cylinder placed in the lathe prior to collapse. The cylinder, in a preferred embodiment of this invention, is a preform which will subsequently be drawn into an optical fiber. While the figure shows the apparatus in a horizontal configuration, the invention may be practiced with the apparatus in a vertical configuration as well. Normally the glass cylinder is rotated in the lathe during the collapse at speeds of approximately 85 ± 20 rpm to maintain heating uniformity. However, the specific speed of rotation is not inherently restricted, but may rather be adjusted according to the dictates of the practitioner.

At 16 one end of the glass cylinder is shown to be at least partially closed off so that an appropriate pressure may be developed within the cylinder during collapse. The tube may be closed off by applying heat to one end and allowing it to melt and fuse in the ordinary fashion known to those skilled in the glass blowing arts. However, other alternative techniques may be used to seal off the downstream end of the tube, and this invention is not restricted to any particular method of sealing the tube.

Once the tube is sealed off a positive pressure is introduced into the cylinder, for example by means of an inlet at 17. This positive pressure is measured by the gauge at 14 and may be lowered by allowing an appropriate escape of gas through the valve at 15. The gas used to pressurize the cylinder is restricted only by obvious considerations. For example, it is clear that one requires a nonexplosive gas, and, in the case of the collapse of optical fiber preforms, it is clearly advantageous to operate with a gas, such as oxygen, nitrogen, or the noble gases, that does not degrade the transmission characteristics of the preform material. While the example specifies the introduction of gas into the tubular preform in order to raise its pressure, the tubular pressure may be raised using other techniques. For example, altering the temperature of one end of the tubular preform will increase the internal tubular pressure. Other techniques for raising the internal tubular pressure may be utilized without limiting the scope of the invention.

The heat source 13 is applied to the cylinder during collapse. While a broad heat source which extends over the entire cylinder may be used, the heat source in the figure is of limited extent and is not maintained stationary but rather traverses the extent of the cylinder during the collapse. The means for traversal may be the standard screw mounted table associated with such lathes and indicated by 17. However, any other means for providing relative translation between the heat source and the preform may be utilized. The heat source is shown schematically to be a flame burner; however, this too is not critical to the practice of the invention and any appropriate heat sources may be utilized, e.g., multiple burners, an electric resistive heat source, or an oven. Depending upon the composition of the cylinder the heat source may traverse the cylinder one or more times in order to effect adequate collapse and maintenance of, or substantial improvement in, the circularity of the cylindrical cross section.

A central idea associated with this invention, and which may serve to guide those who practice it, is that upon heating, the glass cylinder will collapse despite the fact that it is under positive pressure. Of significant importance is applicants' observation that under the conditions described the cylinder collapses into a structure of approximately circular cross section even if the starting structure had serious cross sectional distortions. In view of the fact that the underlying principle involves a detailed relationship between the composition of the material, its temperature, and the amount of pressure within the cylinder, it is clear that the exact parameters cannot be specified for each and every operating condition. However, applicants have found that temperatures in the range of 1300-2000 degrees C. when combined with pressures in the range 0.1 to 10 inches of water and translational velocities of the heating source of the order of 1-17 cm/min results in the desired collapse of typical optical fiber preforms. These values exemplify typical operating conditions; however, the governing principle simply requires adequate heating so as to initiate collapse while maintaining adequate pressure to control the collapse and ultimately yield a circular cross section.

Two general directions are open to the practitioner of this invention. In the first, the pressure within the cylinder is not relieved during the entire process until at least the final total collapse. In this embodiment the temperature of the glass is increased on each subsequent traversal to yield a decreasing cylindrical diameter from traversal to traversal. In an alternative embodiment the temperature of the glass may be maintained approximately constant and the pressure within the cylinder may be relieved on subsequent traversals — though always maintained positive with respect to the surrounding environs — to yield the required collapse. In such an embodiment the extent of depressurization is dependent on the viscosity of the glass and the temperature of the source. Clearly these two processes may be combined in a third hybrid process in which both the internal pressure and the temperature of the heat source are varied from traversal to traversal. In either case the glass cylinder is usually rotated in order to maintain the uniform temperature of the cylinder and to equalize the effects of gravity.

While this invention is of use in the collapse of single composition preforms, especially of large diameter, it is found to be particularly helpful where the glass cylinder is a multilayered structure, for example a graded optical fiber preform. In such an event, if the viscosity of an outer layer is equal to or higher than the viscosity of an inner layer, standard collapse techniques may result in distortions in the circularity of the cylinder cross section. This may be understood by considering that the low viscosity inner layers provide little structural integrity about which the outer layers may collapse. This may be compared to the opposite situation where the inner layers are of much higher viscosity than the outer layers and consequently act as a mandril about which the outer layer may collapse, with the maintenance of the overall structural shape and integrity.

Two common fiber structures exemplify the situation where an inner layer has lower viscosity than an outer layer. One is the common silica fiber with a germanium doped silica core. The germanium doped silica has a lower viscosity than the silica cladding and, when in the form of a tubular preform, will provide little structural integrity during collapse. A second common fiber structure with a low viscosity inner layer includes a radially graded borosilicate core, a borosilicate cladding and a silica jacket. In this structure the borosilicate cladding has a lower viscosity than the silica jacket and during collapse of the appropriate tubular preform provides little structural support.

A number of variations in this technique have been found to be particularly useful. One involves the degree of ultimate collapse. For certain applications it may be desirable to collapse the initial hollow cylinder to a solid structure; while in other situations, one may require a smaller diameter tubular structure. This invention may be used in either case to provide either partial or total collapse. In either case, the cylinder, and in the case of a multilayered structure, the individual layers, are found to retain their circular cross section, or to have improved circularity if the initial cross section was distorted.

An alternative procedure associated with this invention involves the expansion of the hollow cylinder during the initial traversal in order to improve the circularity of an otherwise distorted tube. In this variation the diameter of the cylinder is increased during the first traversal of the heat source by applying additional positive pressure, and subsequently the process proceeds as heretofore described.

This invention is further demonstrated by the following two examples:

EXAMPLE 1

Figure 2:
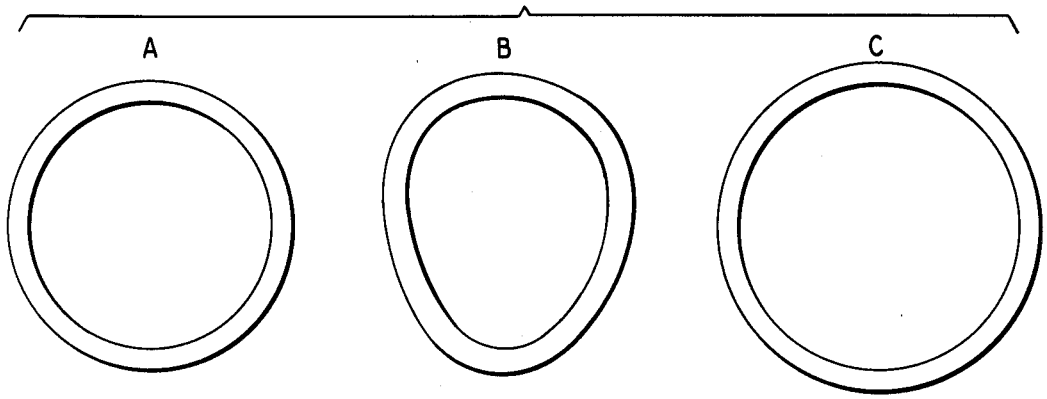
FIG. 2 represents cross sections of three glass tubes and illustrates the efficacy of this invention in returning the cross section of distorted glass cylinders to approximate circularity.

The following experiment was performed to determine the effect of uniformly pressurizing the bore of a radially distorted fused quartz tube at temperatures sufficient to soften the wall of the tube. As mentioned above this step may be inserted prior to collapse to aid in the removal of noncircularities. The cross section of a tube was distorted in a glass-working lathe by traversing the hot zone ($\sim 1650$ degrees C.) of the torch along the length of the tube without rotating it. FIGS. 2-A and 2-B show the original and the distorted cross sections of this tube, respectively. The tube was then pressurized to approximately +4.0 inches of water using the static pressurization technique described above. While rotating the tube in the lathe, the distortion was observed to diminish gradually as the tube was slowly heated from $\sim 1300$ degrees C. to $\sim 1450$ degress C. The tubing became sufficiently soft at temperatures in the range 1475 degrees C. to 1525 degrees C. that a circular cross section was rapidly formed by the uniform outward pressure applied to the bore wall. By traversing the hot zone along the length of the tube under these conditions the radial distortion in the tubing cross section was completely removed as can be seen in FIG. 2-C. During traversals of the torch at temperatures of $\sim 1650$ degrees C., a pressure of only 0.3 inches of water was sufficient to maintain tube circularity while allowing reductions in the diameter of the tube to occur.

EXAMPLE 2

The static pressurization technique was then applied to the collapse of a fused quartz substrate tube in which a uniform $B_2O_3$-$SiO_2$ cladding layer with 14 mole percent $B_2O_3$, and a graded $B_2O_3$-$SiO_2$ core layer, radially doped with 14 mole percent $B_2O_3$ at the cladding to zero percent $B_2O_3$ at the center, had been deposited. The tube had an outside diameter of 14.5 mm and a wall thickness of 2.5 mm. Parameters used in this collapse procedure are listed in Table I.

TABLE I

| | COLLAPSING PARAMETERS FOR BOROSILICATE COMPOSITE TUBE USING STATIC PRESSURIZATION TECHNIQUE | | | | | | | | | | |
|---|---|---|---|---|---|---|---|---|---|---|---|
| Pass | 1 | 2 | 3 | 4 | 5 | 6 | 7 | 8 | 9 | 10 | 11 |
| torch flow rates $H_2$(SCF/H) | 115 | 115 | 115 | 115 | 110 | 110 | 105 | 100 | 100 | 100 | 100 |
| $O_2$(SCF/H) | 39 | 39 | 39 | 39 | 37 | 37 | 35 | 34 | 34 | 34 | 34 |
| translation of fire carriage (cm/min.) | 12.6 | 8.4 | 6.0 | 4.2 | 3.0 | 2.4 | 2.1 | 1.8 | 1.65 | 1.56 | 1.5 |
| bore pressure (inches of water) | 0.5 | 0.3 | 0.3 | 0.3 | 0.3 | 0.3 | 0.3 | 0.3 | 0.2 | 0.2 | 0 |
| approx. temperature (°C.) | 1770 | 1800 | 1820 | 1840 | 1840 | 1850 | 1850 | 1850 | 1850 | 1860 | 1860 |

Figure 3A:
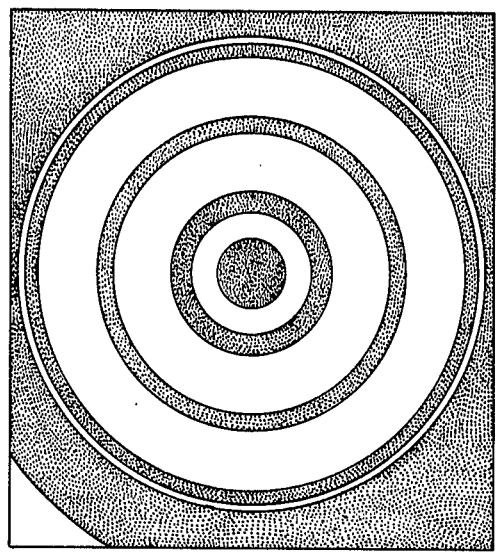
FIG. 3A is a representation of a section of a multilayer cylindrical glass structure which has been collapsed through the practice of this invention.
Figure 3B:
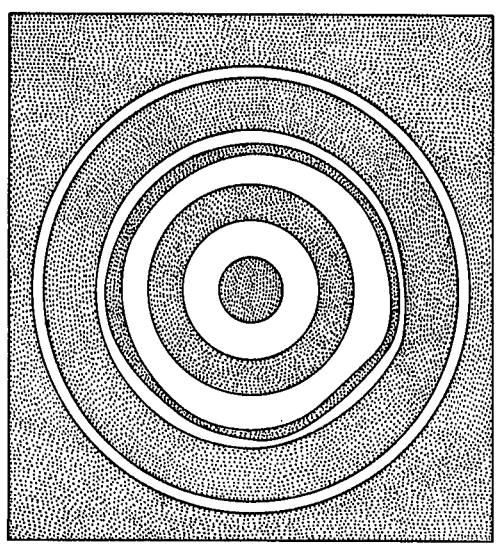
FIG. 3B is a representation of a multilayer cylindrical glass structure which has been collapsed using prior art techniques.

Moderate elliptical distortion present in the composite tube at the conclusion of the deposition step was completely removed during the first two collapsing traversals of the torch along the tube. At temperatures of $\sim 1775$ degrees C., a bore pressurization of only $\sim 0.5$ inches of $H_2O$ was found to correct the radial distortion in the tube. Once again, a bore pressure of $\sim 0.3$ inches of water was observed to maintain the circularity of the collapsing tube during subsequent collapse passes at higher temperatures. On the eleventh pass the composite tube bore was unpressurized and the complete collapse of the tube was obtained. The final diameter of the collapsed tube was 9.5 mm. A microinterferrogram of a fiber drawn from a preform collapsed using the static pressurization technique is represented in FIG. 3A. The circular symmetry of the fiber periphery, cladding, and core regions should be compared to the asymmetry present in the fiber microinterferrogram of FIG. 3B. This latter sample is representative of the inferior results frequently obtained in fibers drawn from preforms which are collapsed without pressurizing the composite tube bore.

What is claimed is:

1. A method of fabricating an optical fiber comprising:
    rotating a tubular optical fiber preform about its cylindrical axis;
    heating a section of the rotating preform with a heat source;
    traversing relatively the rotating preform with the heat source;
    reducing the diameter of the preform to one of essentially circular cross section; and
    drawing the preform into a fiber;

the invention characterized in that the diameter of the preform is reduced while maintaining the inner portion of the preform at a pressure greater than that of the ambient surroundings, and in that the length of the preform is substantially maintained while the diameter is reduced to yield a solid cylindrical optical fiber preform.

2. The process of claim 1 wherein the preform is rotated about the cylindrical axis.

3. The process of claim 1 wherein the heat source traverses relatively the rotating cylinder.

4. The process of claim 3 wherein the heat source traverses the cylinder at least twice and the temperature of the cylinder is increased on each traversal.

5. The process of claim 3 wherein the heat source traverses the cylinder at least twice and the pressure internal to the cylinder is reduced on each traversal.

6. The process of claim 1 wherein the glass cylinder is a multilayered structure.

7. The process of claim 6 wherein the viscosity of an outer layer is greater than or equal to the viscosity of an inner layer.

8. The process of claim 1 wherein the preform is collapsed to a solid structure.

9. The process of claim 1 wherein the preform diameter is initially increased.

10. The product formed by the process of claim 1.

* * * * *